US011859431B2

(12) United States Patent
Soderqvist

(10) Patent No.: US 11,859,431 B2
(45) Date of Patent: Jan. 2, 2024

(54) SWING DOOR-BASED ENTRANCE SYSTEM WITH AUTOMATIC RECOGNITION OF LINKAGE REDUCTION

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 141 days.

(21) Appl. No.: 17/603,514

(22) PCT Filed: Apr. 22, 2020

(86) PCT No.: PCT/EP2020/061202
§ 371 (c)(1),
(2) Date: Oct. 13, 2021

(87) PCT Pub. No.: WO2020/221639
PCT Pub. Date: Nov. 5, 2020

(65) Prior Publication Data
US 2022/0186543 A1 Jun. 16, 2022

(30) Foreign Application Priority Data
May 2, 2019 (SE) .................................... 1930146-4

(51) Int. Cl.
*E05F 15/00* (2015.01)
*E05F 15/63* (2015.01)
*E05F 15/73* (2015.01)

(52) U.S. Cl.
CPC .............. *E05F 15/63* (2015.01); *E05F 15/73* (2015.01); *E05Y 2201/41* (2013.01);
(Continued)

(58) Field of Classification Search
CPC ......... E05F 15/63; E05F 15/616; E05F 15/73; E05F 1/105; E05F 1/10; E05Y 2201/41;
(Continued)

(56) References Cited

U.S. PATENT DOCUMENTS 5,878,530 A * 3/1999 Eccleston ............... E05F 15/63
49/340
6,049,287 A * 4/2000 Yulkowski ............... A62C 2/24
49/31

(Continued)

FOREIGN PATENT DOCUMENTS

AU 720231 5/2000
WO 2011130643 10/2011

OTHER PUBLICATIONS

International Search Report in PCT/EP2020/0061202 dated Aug. 6, 2020.

(Continued)

*Primary Examiner* — Chi Q Nguyen
(74) *Attorney, Agent, or Firm* — Wissing Miller LLP

(57) ABSTRACT

An entrance system (1) comprises a swing door member (10) having a door leaf (12), and a sensor unit (S1; S) mounted to the door leaf (12), the sensor unit comprising a door angle sensor (S1). The entrance system (1) further comprises an automatic door operator (30) having a motor (34) capable of causing movement of the door member (10), a controller (31) for controlling operation of the motor (34), and a linkage (40) connected to the automatic door operator (30) and the door leaf (12) for transferring torque generated by the motor (34) to the door leaf (12). The automatic door operator (30) is operable in a learn mode (60) and an operational mode (70). In the learn mode (60), the controller establishes a linkage reduction curve (65) relating a movement of said door member (10) with the torque required to move the door leaf (12) through different angles (α). The
(Continued)

door leaf angles are determined from measurement readings of said door angle sensor (S1). In the operational mode (70), the controller compensates for a non-linear torque transfer characteristic of the linkage (40) by applying the linkage reduction curve (65) to control the motor (34).

12 Claims, 8 Drawing Sheets

(52) U.S. Cl.
CPC ... *E05Y 2201/422* (2013.01); *E05Y 2400/315* (2013.01); *E05Y 2400/456* (2013.01); *E05Y 2400/502* (2013.01); *E05Y 2400/54* (2013.01); *E05Y 2900/134* (2013.01)

(58) Field of Classification Search
CPC ......... E05Y 2201/422; E05Y 2201/315; E05Y 2015/631; E05Y 2400/33; E05Y 2400/456; E05Y 2400/502; E05Y 2400/54; E05Y 2900/134; E05Y 2400/45; E05Y 2900/132; E05Y 2800/113
See application file for complete search history.

(56) References Cited

U.S. PATENT DOCUMENTS 6,091,217 A 7/2000 Parsadayan
6,223,469 B1 5/2001 Moll
6,891,479 B1 * 5/2005 Eccleston .............. E05F 15/63 340/545.1
7,316,096 B2 * 1/2008 Houser .................. E05F 15/63 49/340
8,225,458 B1 * 7/2012 Hoffberg ................ E05F 15/73 16/84
8,390,219 B2 * 3/2013 Houser .................. E05F 15/40 318/400.38
8,405,337 B2 * 3/2013 Gebhart ................. H02P 6/085 49/506
8,407,937 B2 * 4/2013 Houser .................. E05F 15/63 49/346
9,995,076 B1 * 6/2018 Hoffberg ................ E05F 15/42
2006/0138987 A1 6/2006 McMahon
2006/0197481 A1 9/2006 Hotto et al.
2006/0255757 A1 11/2006 Sommer
2009/0249699 A1 10/2009 Yulkowski
2010/0115853 A1 5/2010 Gebhart et al.
2010/0242368 A1 * 9/2010 Yulkowski ............. E05F 15/63 49/349
2011/0257797 A1 10/2011 Burris et al.
2012/0029701 A1 * 2/2012 Houser .................. E05F 15/63 49/358
2013/0145692 A1 * 6/2013 Laird ..................... E05F 15/73 49/31
2014/0346997 A1 11/2014 Salutzki et al.
2017/0328108 A1 11/2017 Long et al.
2018/0223575 A1 * 8/2018 Hucker .................. E05F 15/79
2018/0223577 A1 8/2018 Hucker

OTHER PUBLICATIONS

Chinese Office Action for Search Report in 2020800331629, dated Feb. 11, 2023.
Swedish Search Report in 1930146-4 dated Oct. 28, 2019.

* cited by examiner

SWING DOOR-BASED ENTRANCE SYSTEM WITH AUTOMATIC RECOGNITION OF LINKAGE REDUCTION

This application is a 371 of PCT/EP2020/061202, filed on Apr. 22, 2020, published on Nov. 5, 2020 under publication number WO 2020/221639, which claims priority benefits from Swedish Patent Application No. 1930146-4, filed on May 2, 2019, the disclosure of which is incorporated herein by reference.

TECHNICAL FIELD

The present invention generally relates to entrance systems having a swing door member and an automatic door operator for causing movement of the swing door member. More specifically, the present invention relates to entrance systems having a linkage which is connected between the automatic door operator and a door leaf of the swing door member for transferring torque generated by a motor of the automatic door operator to the door leaf. The present invention also relates to an associated method of operating an entrance system.

BACKGROUND

Entrance systems having automatic door operators are frequently used for providing automatic opening and closing of one or more movable door members in order to facilitate entrance and exit to buildings, rooms and other areas. The door members are often swing doors. Other types of entrance systems have, for instance, sliding door or revolving doors.

In swing door-based entrance systems, there is at least one swing door member having a door leaf. The door leaf is pivotally hinged to a door frame to allow opening of the swing door member from a closed position to an open position, as well as for allowing closing of the swing door member from the open position to the closed position. A motorized automatic door operator is included in the entrance system and is capable of causing opening of the swing door member. A linkage in the form of a mechanical arm system connects the automatic door operator to the door leaf of the swing door member.

The purpose of automatic door operators in swing door-based entrance systems is to provide automatic opening of the swing door member in various possible applications. Such applications include, for instance, facilitating a disabled person's access to his or her private home, providing access through entrance ports or internal doors at healthcare buildings, office premises, industries or retail stores, providing comfort access to hotel rooms, etc.

Swing door-based entrance systems may also be used in fire door applications. In such applications, the swing door member has a fire proof door leaf having a fire resistant core made of suitable materials. Fire doors are arranged to stop or delay the transfer of thermal energy, i.e. heat, from one side of the door to another side. Moreover, the automatic door operator comprises a forced close arrangement which is adapted to provide mechanical energy from a loaded spring via a transfer mechanism to the linkage, so as to cause forced closing of the door leaf with respect to the door frame in the event of a fire alarm.

The automatic door operator causes opening of the swing door member by an electric motor which generates torque that is transferred to the swing door member via the linkage. The operation of the electric motor is controlled by a controller in the automatic door operator. Since an entrance system with an automatically operated swing door member is a potentially hazardous environment for people and objects that might be hit or jammed by the moving swing door member, an entrance system needs to satisfy various technical standard requirements, the purpose of which is to safeguard that the operation of the swing door member is performed in an accurately controlled manner.

In order for the controller of the automatic door operator to cause an accurately controlled movement of the swing door member all the way from a shut closed position to a swung open position, the controller needs various control input data. A revolution counter at the motor shaft of the electric motor provides one such type of control input data. The controller also needs other control input data, such as the inertia of the swing door member, the friction in the transmission (gear box) of the electric motor, and the spring force of the forced close arrangement when applicable. Such control input data may be established by manual settings or be obtained in a learn cycle, since they are either a constant value or generally linear in nature (i.e., are linearly dependent on the door leaf angle).

In addition to this, the controller of the automatic door operator also has to take into account the torque transfer characteristics of the linkage that connects the automatic door operator and its electric motor and transmission with the door leaf of the swing door member. The torque transfer characteristics of the linkage have a non-linear nature that makes the controller's task more complex. The torque transfer characteristics of the linkage will depend on many factors, such as for instance whether the swing door member is mounted for pull actuation or push actuation by the automatic door operator, the distance between an outgoing spindle of the automatic door operator and a hinge axis of the swing door member, the dimensions and mass of the door leaf, etc.

A prior art approach of defining these necessary factors has involved use of dip switches for selecting a certain setting of estimated torque transfer characteristics of the linkage among a limited number of available settings. For instance, if four dip switches are provided, then an installer or maintenance person may select between a maximum of 16 different settings for the estimated torque transfer characteristics of the linkage.

The present inventor has realized that the prior art approach has several disadvantages.

First, it is dependent on manual selection of the dip switch setting and is therefore subject to human errors.

Second, the number of available settings is limited and may not be enough to provide an accurate estimation of the estimated torque transfer characteristics of the linkage in a particular actual application.

Third, but not least, there is a risk that the critical parts of the entrance system (e.g. the automatic door operator, the linkage and the door leaf being hinged to the door frame) are mounted in a way that does not comply with the mounting requirements that were intended by a certain dip switch setting. This may be due to human errors or sloppiness in the installation procedure, or because the building in which the entrance system is installed will be subject to restrictions in terms of margins, dimensions, available space, etc.

Because of these shortcomings, the entrance system might fail to satisfy the technical standard requirements. In turn, this may increase the risk for accidents, malfunction and excessive wear of the components of the entrance system.

Accordingly, the present inventor has realized that there is room for improvements in the field of swing door-based entrance systems.

SUMMARY

An object of the present invention is therefore to provide one or more improvements when it comes to accounting for the non-linear torque transfer characteristics of the linkage in a swing door-based entrance system, in consideration of the complexity explained in the background section of this document.

Accordingly, a first aspect of the present invention is an entrance system comprising a swing door member and an automatic door operator. The swing door member has a door leaf and a sensor unit mounted to the door leaf. The sensor unit comprises a door angle sensor, such as at least one of an accelerometer and a gyroscope.

The automatic door operator has a motor capable of causing movement of the door member, a controller for controlling operation of the motor, and a linkage connected to the automatic door operator and the door leaf for transferring torque generated by the motor to the door leaf.

The automatic door operator is operable in a learn mode and an operational mode. The controller is configured, in the learn mode, to automatically establish a linkage reduction curve by determining, for a movement of the door member between a shut closed position of the door leaf and a swung open position of the door leaf, the torque required by the motor to cause movement of the door leaf at different door leaf angles. The different door leaf angles are determined from measurement readings of the door angle sensor.

The controller is configured, in the operational mode, to compensate for a non-linear torque transfer characteristic of the linkage by applying the linkage reduction curve when controlling the motor to cause the door member to swing open.

The provision of such an entrance system will solve or at least mitigate one or more of the problems or drawbacks identified in the background section of this document, as will be clear from the following detailed description section and the drawings.

A second aspect of the present invention is a method of operating an entrance system which comprises a swing door member having a door leaf, and a sensor unit mounted to the door leaf, the sensor unit comprising a door angle sensor, and which furthermore comprises an automatic door operator having a motor capable of causing movement of the door member, a controller for controlling operation of the motor, and a linkage connected to the automatic door operator and the door leaf for transferring torque generated by the motor to the door leaf.

The method involves operating the automatic door operator in a learn mode. The learn mode involves:

controlling the motor to cause movement of the door leaf between a shut closed position of the door leaf and a swung open position of the door leaf, obtaining measurement readings of the door angle sensor during the movement, determining different door leaf angles from the obtained measurement readings, and automatically establishing a linkage reduction curve by determining the torque required by the motor to cause the movement of the door leaf at the different door leaf angles.

The method further involves operating the automatic door operator in an operational mode. The operational mode involves:

controlling the motor to cause movement of the door leaf to swing open while applying the linkage reduction curve to compensate for a non-linear torque transfer characteristic of the linkage.

The provision of such a method will solve or at least mitigate one or more of the problems or drawbacks identified in the background section of this document, as will be clear from the following detailed description section and the drawings.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something, or "capable of" doing something in this document is intended to mean the same as the entity being "arranged for", "configured for" or "adapted for" doing this very something, and vice versa.

BRIEF DESCRIPTION OF THE DRAWINGS

Objects, features and advantages of embodiments of the invention will appear from the following detailed description, reference being made to the accompanying drawings.

DETAILED DESCRIPTION OF EMBODIMENTS

Figure 1:
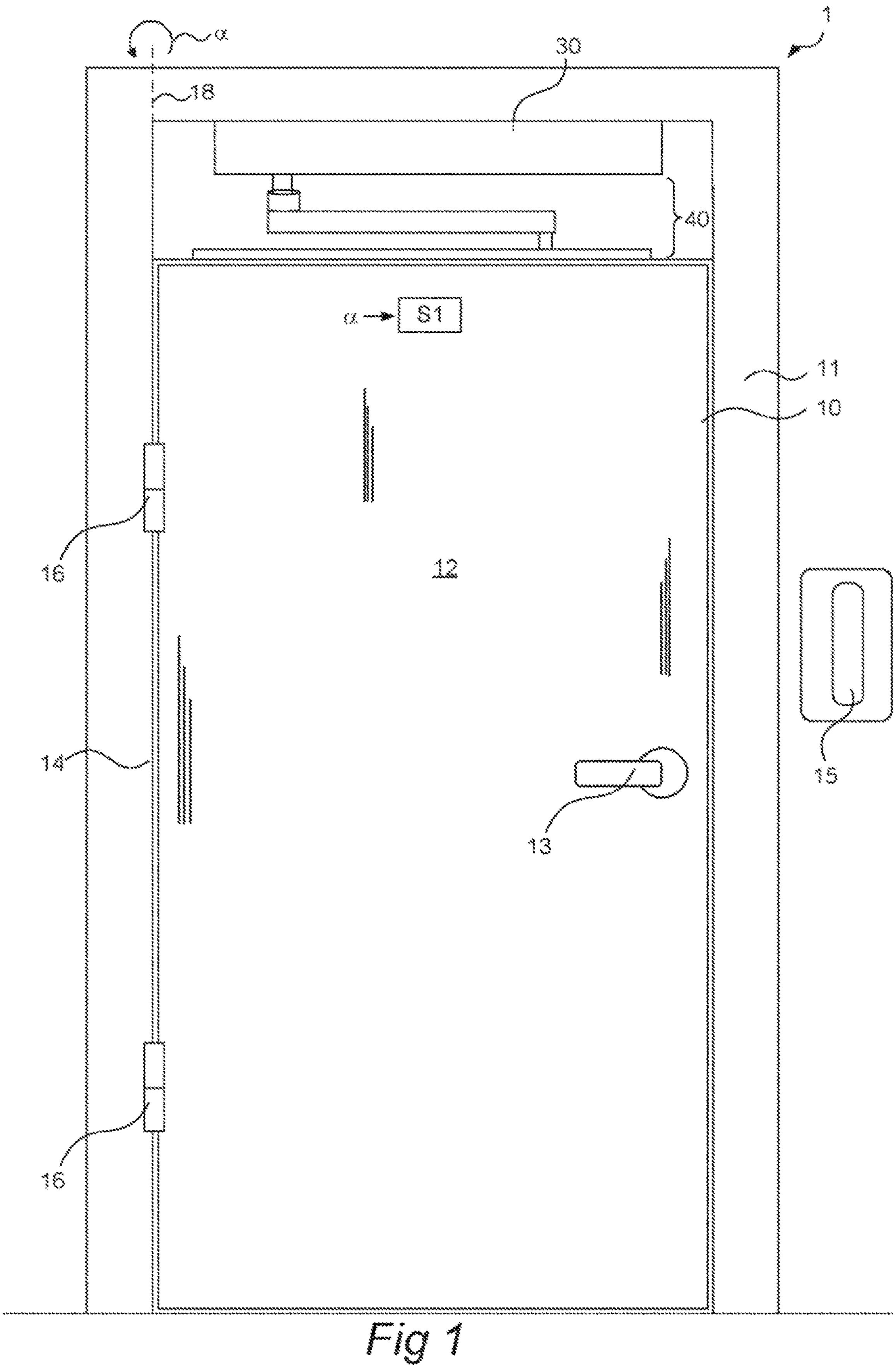
FIG. 1 is a schematic block diagram of one embodiment of an entrance system having a swing door member, an automatic door operator and a sensor unit.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is a schematic front view of a swing door-based entrance system. The entrance system 1 comprises a swing door member 10 having a door leaf 12.

The swing door member 10 is pivotally supported at a vertical edge 14 by hinges 16 for allowing opening of the swing door member 10 from a closed position to an open position, as well as for allowing closing of the swing door member 10 from the open position to the closed position. The swing door member 10 is hence supported by a door frame 11 for pivotal motion around a rotational axis 18 which is coincident with the hinges 16.

The entrance system 1 comprises a motorized automatic door operator 30 capable of causing opening of the swing door member 10. A linkage (arm mechanism) 40 connects the automatic door operator 30 to the door leaf 12 of the swing door member 10. The door operator 30 may be arranged in conjunction with the door frame 11 and is typically a concealed overhead installation in or at the door frame 11 (hence, the linkage mechanism 40 and automatic door operator 30 are normally not as visible to the naked eye as appears to be the case in FIG. 1).

The automatic door operator 30 may be triggered by sensor equipment in the entrance system 1. Such sensor equipment may include activity sensors (e.g. IR or radar based sensors) which are adapted to detect an approaching user and accordingly trigger the automatic door operator 30 to open the swing door member 10. Alternatively, the automatic door operator 30 may be triggered by a user actuating a door-open push button 15, or similar actuator. The entrance system 1 will typically also allow the user to open or close the swing door member 10 by pulling or pushing a door handle 13 by manual force, i.e. without using the motorized automatic door operator 30.

The automatic door operator 30 may provide automatic opening of the swing door 10 in various possible applications. Such applications include, for instance, facilitating a disabled person's access to his or her private home, providing access through entrance ports or internal doors at health-care buildings, office premises, industries or retail stores, providing comfort access to hotel rooms, etc. The automatic door operator 30 may also be used in fire door applications, as previously explained in the background section of this document.

The swing door member 10 furthermore has a sensor unit mounted to the door leaf 12. The sensor unit comprises a door angle sensor S1 capable of measuring a door leaf angle α of the door leaf 12. In embodiments of the invention, the door angle sensor S1 comprises at least one of an accelerometer and a gyroscope.

Figure 4:
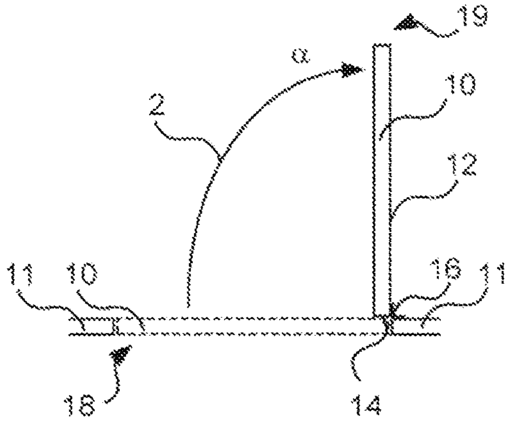
FIG. 4 illustrates movement of the swing door member from a shut closed position to a swung open position.

FIG. 4 illustrates the opening of the swing door member 10 in one embodiment of the entrance system 1 from a shut closed position 18 to a swung open position 19. The opening movement is indicated by an arrow 2. As can be seen in FIG. 4, during the opening 2 of the swing door member 10, the door leaf angle α as measured by the door angle sensor S1 will span from about 0° to about 90°. In other embodiments, the swung open position may be at a door leaf angle α different from about 90°, such as for instance about 180°.

Figure 5:
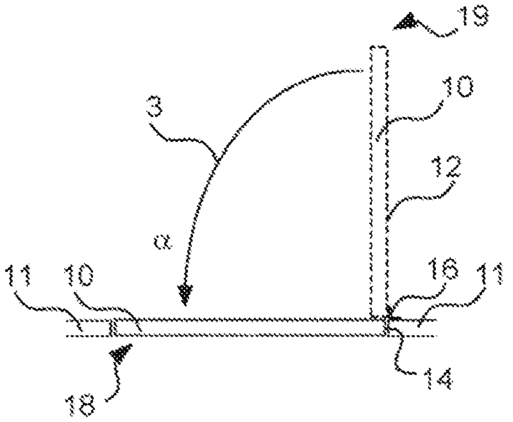
FIG. 5 illustrates movement of the swing door member from the swung open position to the shut closed position.

FIG. 5 correspondingly illustrates the closing of the swing door member 10 of the entrance system 1 from the swung open position 19 to the shut closed position 18. The closing movement is indicated by an arrow 3. As can be seen in FIG. 5, during the closing 3 of the swing door member 10, the door leaf angle α as measured by the door angle sensor S1 will span from about 90° to about 0°. In other embodiments where the swung open position is at a door leaf angle α different from about 90°, such as for instance about 180°, the door leaf angle α as measured by the door angle sensor S1 will of course start spanning from such other door leaf angle α.

The present invention makes novel and inventive use of the door angle sensor S1 to automatically establish a linkage reduction curve for the linkage 40 in a learn mode of the automatic door operator 30. This will described in more detail later in this section.

Figure 2:
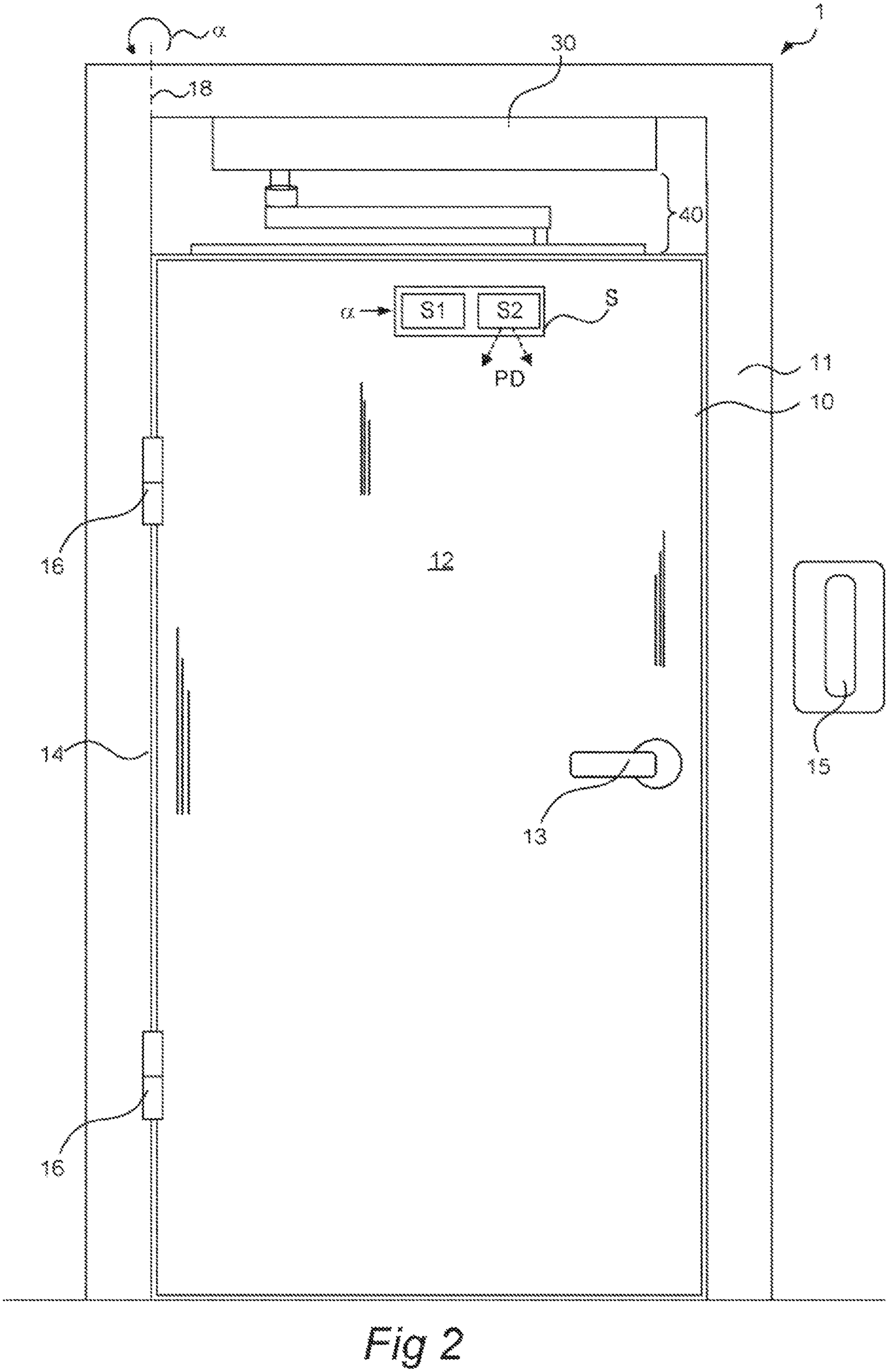
FIG. 2 is a schematic block diagram of another embodiment of an entrance system having a swing door member, an automatic door operator and a sensor unit.

To avoid dangerous situations where a present, approaching or departing person or object (including but not limited to pets or articles brought by the person) might be hit or jammed by the door leaf 12 of the swing door member 10, a safety sensor may be provided. Hence, in some embodiments, in addition to the door angle sensor S1, the sensor unit mounted to the door leaf 12 comprises a safety sensor for monitoring a zone at or near the door leaf 12 for presence or activity of a person or object. This can be seen for sensor unit S in the entrance system 1 shown in FIG. 2; the sensor unit S comprises the door angle sensor S1 as well as a safety sensor S2. Advantageously, the sensor unit S contains both the door angle sensor S1 and the safety sensor S2 within a common single device housing. The sensor unit S is mounted at an appropriate position on the surface of the door leaf 12. As can be seen in FIG. 2, such a position is often at an uppermost part of the door leaf 12.

The purpose of the safety sensor S2 is to monitor a zone, or volume, at or near the door leaf 12 for presence or activity of a person or object. If a person or object is detected in the monitored zone, the automatic door operator 30 shall not be allowed to move the swing door member 10 in a direction in which the swing door member 10 may hit or jam that person or object. Accordingly, the automatic door operator 30 is configured to receive monitoring data from the safety sensor S2. If the monitoring data indicates presence or activity of a person or object in the monitored zone, the automatic door operator 30 is configured to refrain from driving a motor of the automatic door operator 30 to cause movement of the swing door member 10, and/or force the motor to stop an ongoing movement of the swing door member 10.

Figure 3:
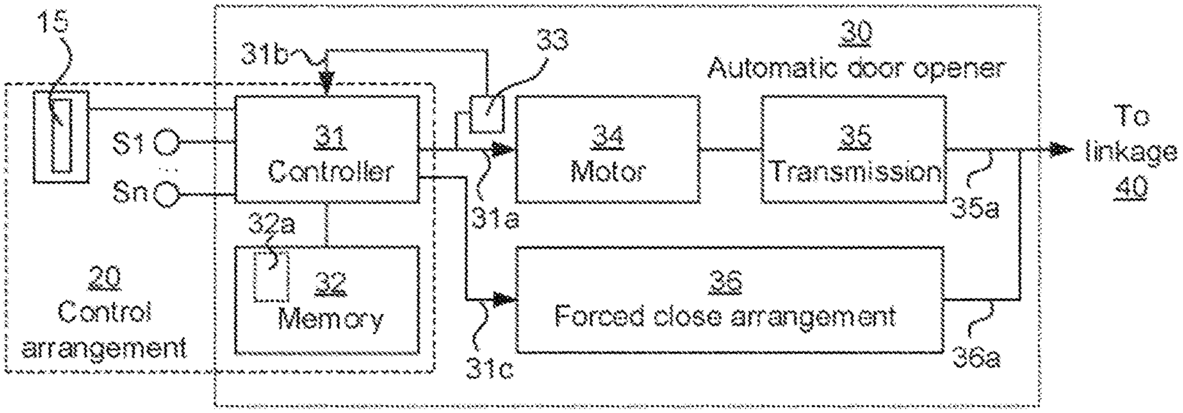
FIG. 3 is a schematic block diagram of an automatic door operator according to one embodiment.

Reference is now made to FIG. 3 which illustrates an embodiment of the automatic door operator 30 in more detail. The automatic door operator 30 comprises a motor 34, typically an electrical motor, being connected to a transmission 35. An output shaft 35*a* of the transmission 35 rotates upon activation of the motor 34 and is connected to the linkage 40. The linkage 40 translates the motion of the output shaft 35*a* into an opening motion of the door leaf 12 with respect to the door frame 11 (c.f opening movement 2 in FIG. 4).

The automatic door operator 30 also comprises a control arrangement 20 including a controller 31 which is configured for performing different functions of the automatic door operator 30. One or more of these functions relates to opening of the door leaf 12 with respect to the door frame 11. Accordingly, the controller 31 has a control output 31*a* connected to the motor 34 for controlling the actuation thereof.

In addition to the controller 31, the control arrangement 20 comprises a number n of sensor functions, including or consisting of the aforementioned door angle sensor S1, safety sensor S2, activity sensor and door-open push button 15. The sensor functions are operatively connected with the controller 31 to report detection results or measurement readings to the controller 31.

A revolution counter 33, such as an encoder or other angular sensor, is provided at the motor 34 to monitor the revolution of a motor shaft of the motor 34. The revolution counter 33 is connected to an input 31*b* of the controller 31. The controller 31 is configured to use one or more readings of the revolution counter 33, typically a number of pulses generated as the motor shaft rotates, for determining a current angular position, e.g. door leaf angle α, of the door leaf 12 of the swing door member 10.

The controller 31 may be implemented in any known controller technology, including but not limited to micro-controller, processor (e.g. PLC, CPU, DSP), FPGA, ASIC or any other suitable digital and/or analog circuitry capable of performing the intended functionality.

The controller 31 has an associated memory 32. The memory 32 may be implemented in any known memory technology, including but not limited to E(E)PROM, S(D) RAM or flash memory. In some embodiments, the memory 32 may be integrated with or internal to the controller 31. As seen at 32*a*, the memory 32 may store program instructions for execution by the controller 31, as well as temporary and permanent data used by the controller 31.

The embodiment of the automatic door operator 30 shown in FIG. 3 is intended for fire door usage and therefore includes a forced close arrangement 36. (It is to be noticed that while the present invention is believed to be advantageous in fire door applications, the invention may alternatively be used in applications which do not relate to fire door usage.)

The forced close arrangement 36 is adapted to provide mechanical energy via a transfer mechanism to the linkage 40, so as to cause forced closing of the door leaf 12 with respect to the door frame 10 in the event of a fire alarm. In the disclosed embodiment, the forced close arrangement 36 comprises a helical compression spring.

During opening of the swing door member 10 by the torque generated by the motor 34, the compression spring is tensioned by the rotation of the output shaft 35*a*, as can be seen at 36*a*. During the forced closing cycle, the accumulated spring force of the compression spring is transferred to the output shaft 35 at 36*a* by means of the transfer mechanism, which in the disclosed embodiment includes a pressure roller that acts on a cam curve being connected to the output shaft 35*a*. In other embodiments, the forced close arrangement 36 may comprise a different kind of spring, and its transfer mechanism may comprise a different kind of mechanism.

The controller 31 may receive an external fire alarm signal via a control input and generate a control signal 31*c* to the forced close arrangement 36, so as to cause release of the accumulated spring force.

Figure 6:
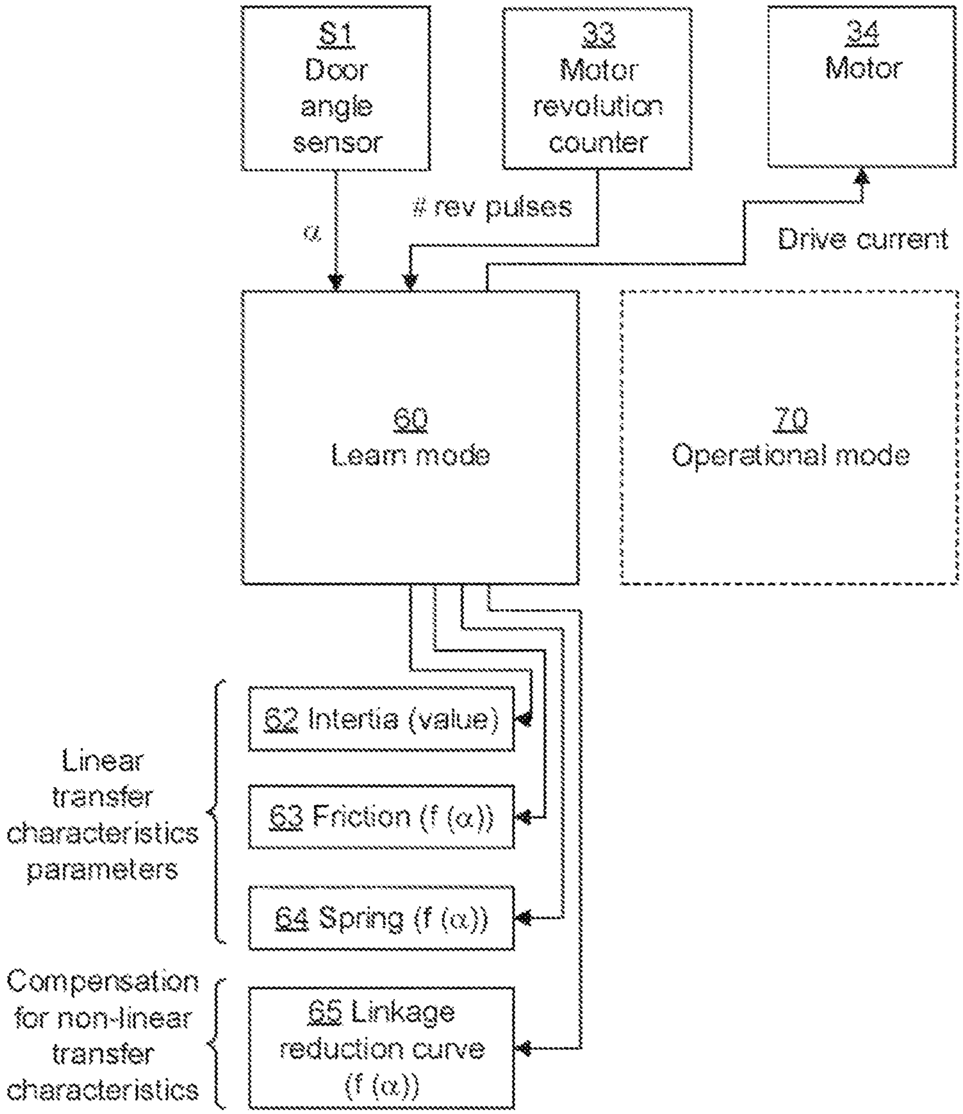
FIG. 6 illustrates a learn mode of the automatic door operator.
Figure 7:
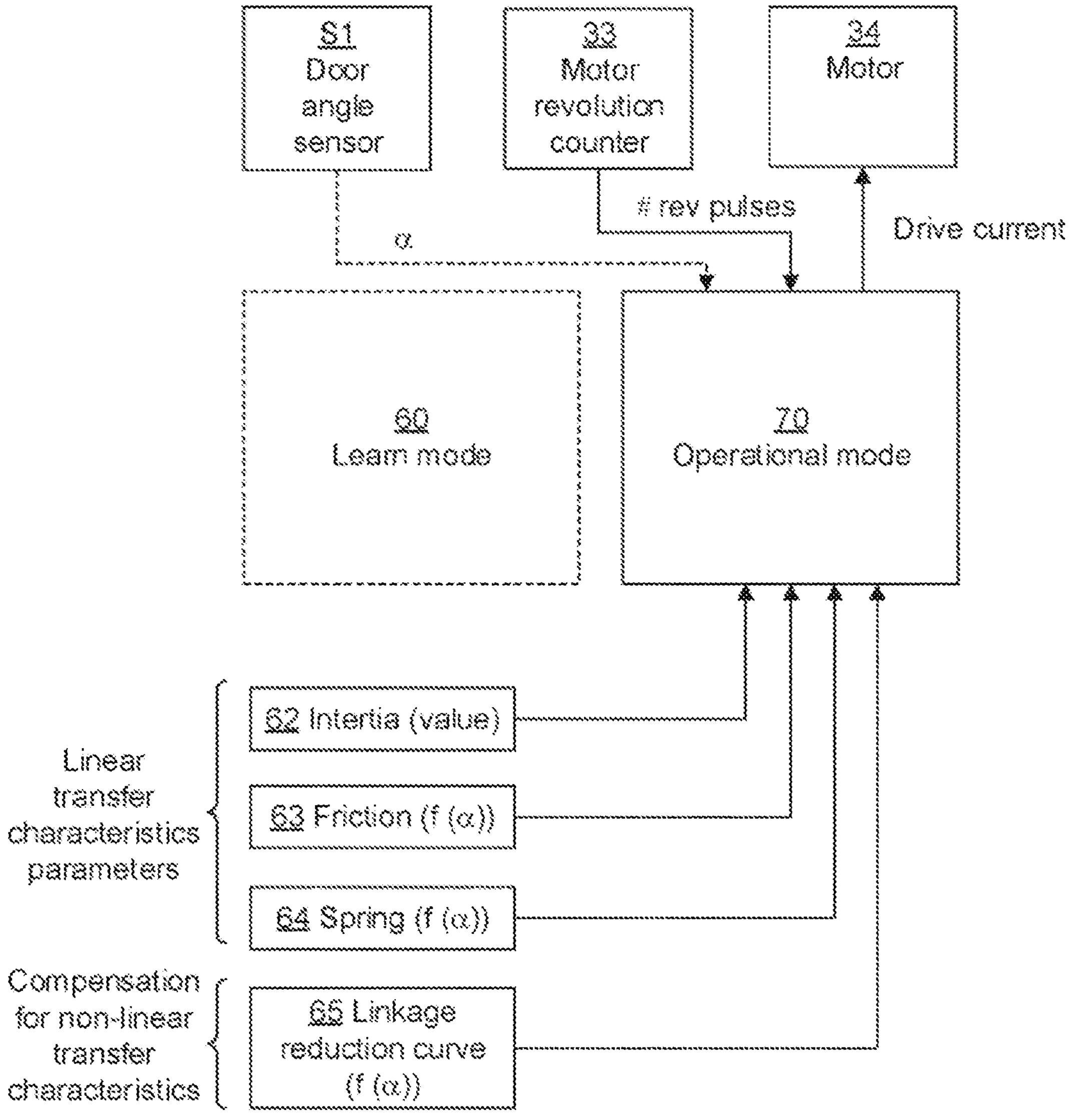
FIG. 7 illustrates an operational mode of the automatic door operator.

As will now be described with reference to FIGS. 6 and 7, the automatic door operator 30 is operable in a learn mode 60 and in an operational mode 70.

In the learn mode 60, the controller 31 of the automatic door operator 30 is configured to establish information required as control input data for subsequent use by the controller 31 during normal operation. The established information may include the inertia 62 of the swing door member 10 (being a constant value), the friction 63 in the transmission (gear box) of the electric motor 34 (being linearly dependent on the door leaf angle), and—when a forced close arrangement 36 is provided—the spring force 64 thereof (being linearly dependent on the door leaf angle).

In addition to the above, in the learn mode 60 the controller 31 of the automatic door operator 30 is configured to automatically establish a linkage reduction curve 65 by determining, for a movement of the swing door member 10 between the shut closed position 18 and the swung open position 19 of the door leaf 12, the torque required by the motor 34 to cause movement of the door leaf 12 at different door leaf angles α. The different door leaf angles are determined from measurement readings of the door angle sensor S1. The torque may be determined by counting the number of pulses reported from the revolution counter 33 during movement of the swing door member 10 by a certain angular amount, i.e. an increase in the door leaf angle α by a certain angular amount m. The certain angular amount m may, for instance, be 1°, or more or less than 1° depending on the desired angular resolution of the linkage reduction curve 65 to be established.

Figure 8:
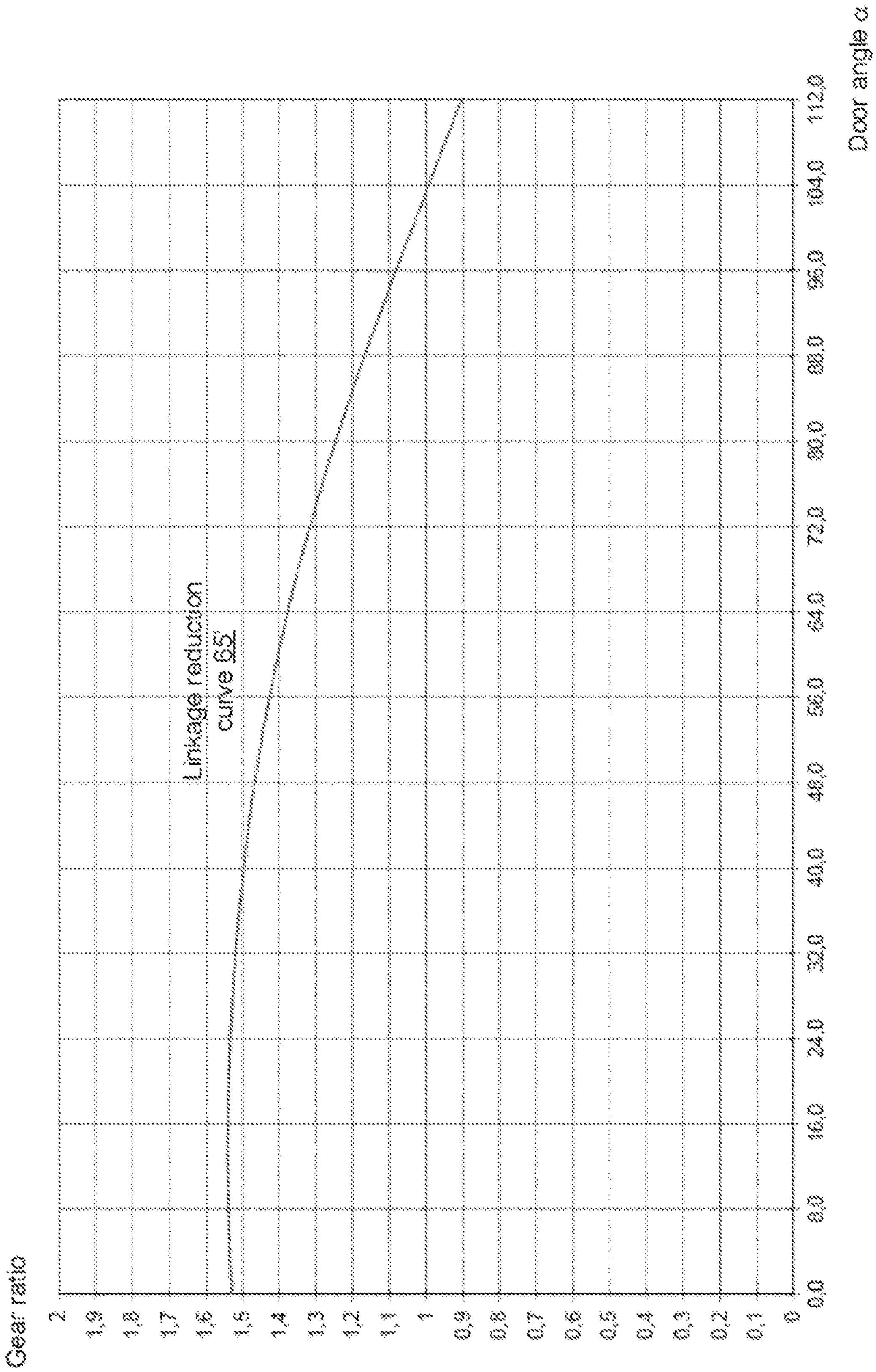
FIG. 8 is a graph illustrating an exemplifying linkage reduction curve for a configuration of a swing door member mounted for pull actuation by the automatic door operator via a linkage.

A first example of a linkage reduction curve 65' is shown in FIG. 8. The linkage reduction curve 65' in FIG. 8 has been automatically established as described above for a configuration of a swing door member 10 mounted for pull actuation by the automatic door operator 30.

Figure 9:
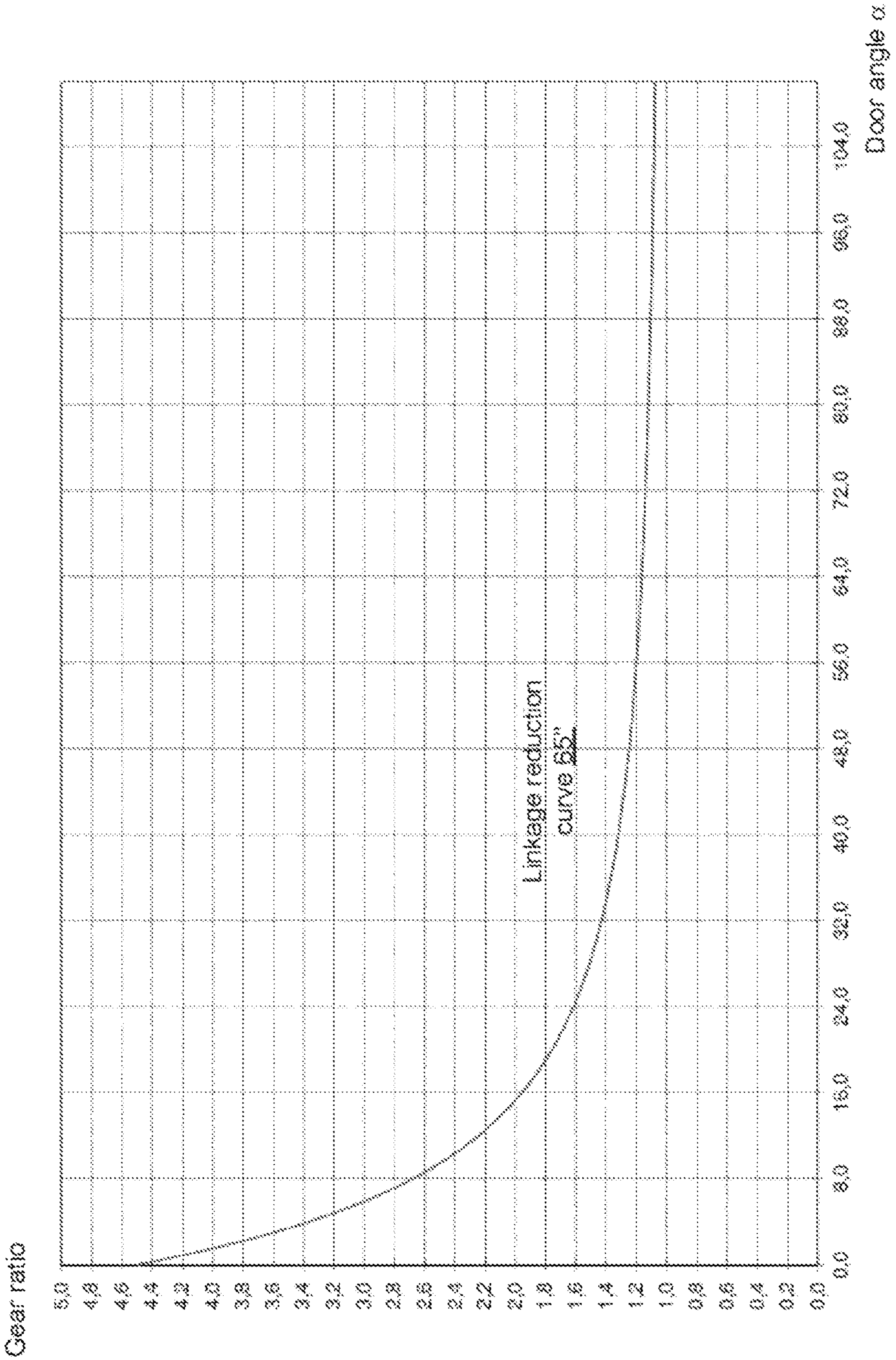
FIG. 9 is a graph illustrating an exemplifying linkage reduction curve for a configuration of a swing door member mounted for push actuation by the automatic door operator via a linkage.

A second example of a linkage reduction curve 65" is shown in FIG. 9. The linkage reduction curve 65" in FIG. 9 has been automatically established as described above for a configuration of a swing door member mounted for push actuation by the automatic door operator.

The automatically established linkage reduction curve 65 (65', 65") may be stored in the memory 32 for subsequent usage by the controller 31 in the operational mode 70.

In the operational mode 70, the controller 31 of the automatic door operator 30 is configured to compensate for a non-linear torque transfer characteristic of the linkage 40 by applying the established linkage reduction curve 65 when controlling the motor 34 to cause the door member 10 to swing open. The controller 31 will also use the other control input data established in the learn mode 60, e.g. the inertia 62, friction 63 and spring force 64, as well as the number of pulses reported from the revolution counter 33 during movement of the swing door member 10, to repeatedly calculate set values of the drive current of the motor 34 from this information during the movement of the door member 10 to cause it to swing open. In some embodiments, the controller 31 may use measurement readings from the door angle sensor S1 also in the operational mode 70, to improve the angular accuracy of the control of the movement of the swing door member 10.

The reader is invited to notice the considerable difference between the linkage reduction curves 65' and 65" in FIGS. 8 and 9. The present invention offers a substantial improvement since it offers precise and automatic recognition of the linkage reduction curve 65 of the linkage 40, thereby making it possible to accurately compensate for the non-linear torque transfer characteristic of the linkage 40—which may differ considerably from installation to installation, as evidenced by FIGS. 8 and 9.

Figure 10:
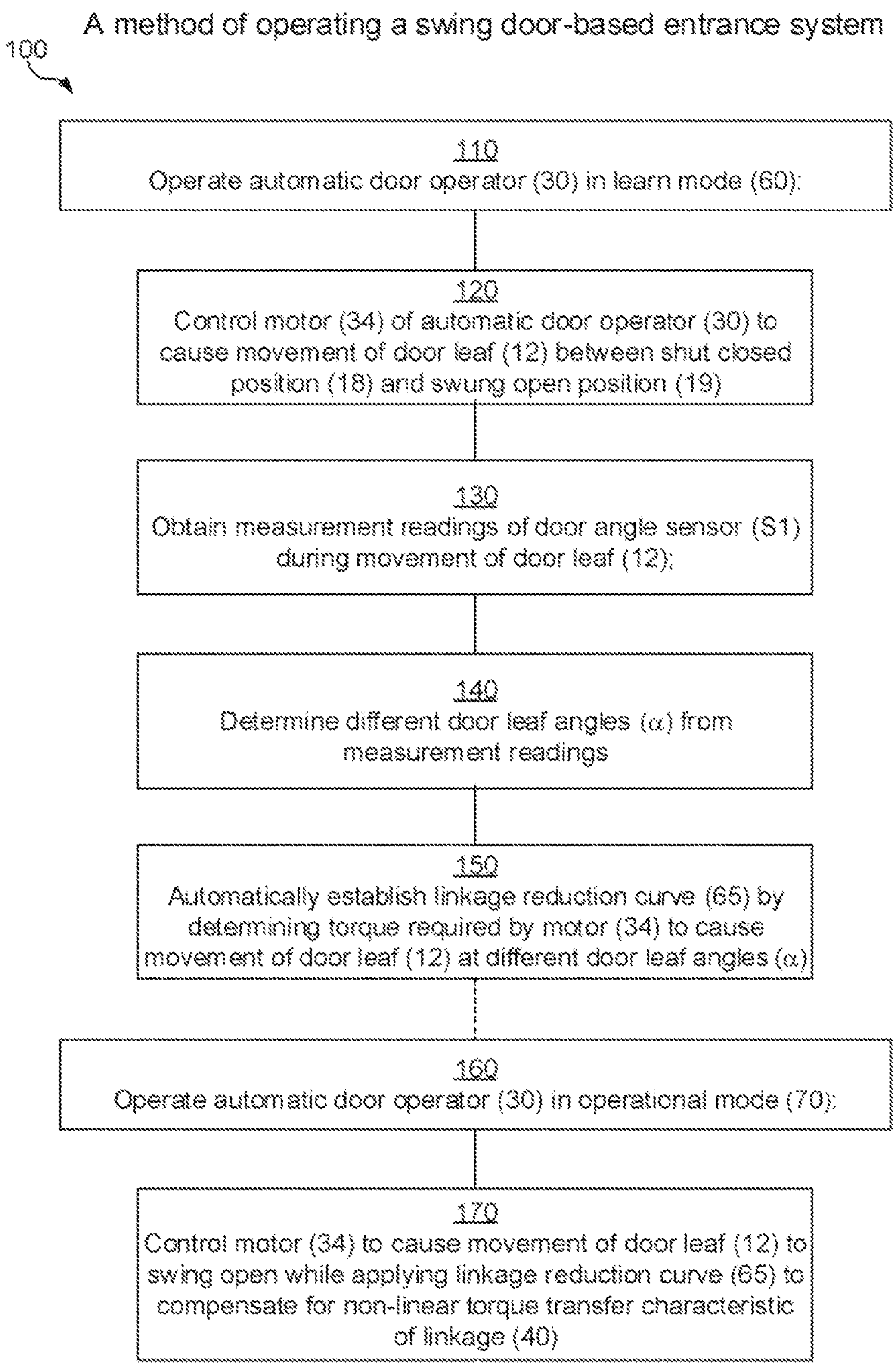
FIG. 10 is a flowchart diagram illustrating a method of operating a swing door-based entrance system generally according to the present invention.

The functionality performed in accordance with the present invention as described herein is illustrated as a method 100 in the flowchart diagram shown in FIG. 10. The method 100 first involves operating 110 the automatic door operator 30 in the learn mode 60. The learn mode 60 involves controlling 120 the motor 34 to cause movement of the door leaf 12 between the shut closed position 18 and the swung open position 19 of the door leaf 12. The learn mode 60 further involves obtaining 130 measurement readings of the door angle sensor S1 during this movement, and determining 140 different door leaf angles α from the obtained measurement readings. The learn mode 60 automatically establishes 150 a linkage reduction curve 65 by determining the torque required by the motor 34 to cause the movement of the door leaf 12 at the different door leaf angles α.

The method 100 in FIG. 10 then involves operating 160 the automatic door operator 30 in the operational mode 70. The operational mode 70 involves controlling 170 the motor 34 to cause movement of the door leaf 12 to swing open while applying the linkage reduction curve 65 to compensate for the non-linear torque transfer characteristic of the linkage 40.

In a refined embodiment, the method 100 involves analyzing the established linkage reduction curve 65, detecting an anomaly thereof, and causing an action in response to the detected anomaly.

The anomaly of the established linkage reduction curve 65 may be detected by comparing the established linkage reduction curve 65 to predetermined reference data which may include one or more of the following information:

- Permitted maximum gear ratio (global maximum)
- Permitted minimum gear ratio (global minimum)
- Permitted maximum gear ratio for a given range of the door leaf angle (local maximum)
- Permitted minimum gear ratio for a given range of the door leaf angle (local minimum)
- Permitted maximum increase in gear ratio (global maximum)
- Permitted maximum decrease in gear ratio (global negative maximum)
- Permitted maximum increase in gear ratio for a given range of the door leaf angle (local maximum)
- Permitted maximum decrease in gear ratio for a given range of the door leaf angle (local negative maximum)

The action caused in response to the detected anomaly may involve generating an audible, visible or tactile alert to inform a human user of the detected anomaly. Alternatively or additionally, the action caused in response to the detected anomaly may involve preventing operation of the motor 34 of the automatic door operator 30.

The controller 31 of the automatic door operator 30 in the entrance system 1 may be configured to perform the aforementioned functionality for analyzing the established linkage reduction curve 65, detecting an anomaly thereof, and causing an action in response to the detected anomaly.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more movable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. An entrance system comprising:

a swing door member having a door leaf, and a sensor unit mounted to the door leaf, the sensor unit comprising a door angle sensor; and an automatic door operator having a motor capable of causing movement of the door member, a controller for controlling operation of the motor, and a linkage connected to the automatic door operator and the door leaf for transferring torque generated by the motor to the door leaf, the automatic door operator being operable in a learn mode and an operational mode, wherein the controller is configured, in the learn mode, to:

automatically establish a linkage reduction curve by determining, for a movement of said door member between a shut closed position of said door leaf and a swung open position of said door leaf, the torque required by said motor to cause movement of said door leaf at different door leaf angles (α), the different door leaf angles being determined from measurement readings of said door angle sensor;

and wherein the controller is configured, in the operational mode, to:

compensate for a non-linear torque transfer characteristic of said linkage by applying the linkage reduction curve to control said motor to cause the door member to swing open.

2. The entrance system as defined in claim 1, wherein the door angle sensor comprises at least one of:

an accelerometer; and a gyroscope.

3. The entrance system as defined in claim 1, wherein the sensor unit comprises, in addition to said door angle sensor, a safety sensor for monitoring a zone at or near the door leaf for presence or activity of a person or object.

4. The entrance system as defined in claim 3, wherein the sensor unit contains both the door angle sensor and the safety sensor within a common single device housing.

5. The entrance system as defined in claim 3, wherein the controller of the automatic door operator is configured to:

receive monitoring data from the safety sensor; and determine from the monitoring data a presence or activity of a person or object in the monitored zone, and refrain from controlling the motor to cause movement of the door member or control the motor to stop an ongoing movement of the door member.

6. The entrance system as defined in claim 1, wherein the controller of the automatic door operator is configured to:

analyze the established linkage reduction curve;

detect an anomaly thereof; and cause an action in response to the detected anomaly.

7. The entrance system as defined in claim 6, wherein the action caused in response to the detected anomaly involves generating an audible, visible or tactile alert to inform a human user of the detected anomaly.

8. The entrance system as defined in claim 6, wherein the action caused in response to the detected anomaly involves preventing operation of the motor of the automatic door operator.

9. A method of operating an entrance system comprising a swing door member having a door leaf and a sensor unit mounted to the door leaf, the sensor unit comprising a door angle sensor, the entrance system further comprising an automatic door operator having a motor capable of causing movement of the door member, a controller for controlling operation of the motor, and a linkage connected to the automatic door operator and the door leaf for transferring torque generated by the motor to the door leaf, the method involving:

operating the automatic door operator in a learn mode, the learn mode comprising:

controlling said motor to cause movement of said door leaf between a shut closed position of said door leaf and a swung open position of said door leaf;

obtaining measurement readings of said door angle sensor during said movement;

determining different door leaf angles (α) from the obtained measurement readings; and automatically establishing a linkage reduction curve by determining the torque required by said motor to cause said movement of said door leaf at said different door leaf angles (α); and operating the automatic door operator in an operational mode, the operating mode comprising:

controlling said motor to cause movement of said door leaf to swing open while applying the linkage reduction curve to compensate for a non-linear torque transfer characteristic of said linkage.

10. The method as defined in claim 9, further involving:

analyzing the established linkage reduction curve;

detecting an anomaly thereof; and causing an action in response to the detected anomaly.

11. The method as defined in claim 10, wherein the action caused in response to the detected anomaly involves generating an audible, visible or tactile alert to inform a human user of the detected anomaly.

12. The method as defined in claim 10, wherein the action caused in response to the detected anomaly involves preventing operation of the motor of the automatic door operator.

* * * * *